United States Patent [19]

Abdulwahab et al.

[11] Patent Number: 4,839,721

[45] Date of Patent: Jun. 13, 1989

[54] METHOD OF AND APPARATUS FOR TRANSFORMING COLOR IMAGE DATA ON THE BASIS OF AN ISOTROPIC AND UNIFORM COLORIMETRIC SPACE

[75] Inventors: Munib Abdulwahab, East Boston; James L. Burkhardt, Watertown; John J. McCann, Belmont, all of Mass.

[73] Assignee: Polaroid Corporation, Cambridge, Mass.

[21] Appl. No.: 645,093

[22] Filed: Aug. 28, 1984

[51] Int. Cl.⁴ .............................................. G03F 3/08
[52] U.S. Cl. ...................................................... 358/80
[58] Field of Search ........................................... 358/80

[56] References Cited

U.S. PATENT DOCUMENTS

| | | | |
|---|---|---|---|
| 3,553,360 | 1/1971 | Land et al. | 358/21 R |
| 3,600,505 | 8/1971 | Dobouney | 358/80 |
| 3,612,753 | 10/1971 | Korman | 358/80 |
| 3,651,252 | 3/1972 | Land et al. | 358/212 |
| 3,893,166 | 7/1975 | Pugsley | 358/80 |
| 4,060,829 | 11/1977 | Sakamoto | 358/80 |
| 4,075,662 | 2/1978 | Gall | 358/80 |
| 4,090,243 | 5/1978 | Kotera et al. | 364/526 |
| 4,092,668 | 5/1978 | Knop | 358/80 |
| 4,127,871 | 11/1978 | Sakamoto | 358/80 |
| 4,174,514 | 11/1979 | Sternberg | 340/146.3 MA |
| 4,229,797 | 10/1980 | Ledley | 364/515 |
| 4,275,413 | 6/1981 | Sakamoto et al. | 358/80 |
| 4,334,240 | 6/1982 | Franklin | 358/80 |
| 4,346,402 | 8/1982 | Pugsley | 358/80 |
| 4,353,092 | 10/1982 | Bailey et al. | 358/160 |
| 4,384,336 | 5/1983 | Frankle et al. | 358/280 |
| 4,402,007 | 8/1983 | Yamada | 358/80 |
| 4,402,015 | 8/1983 | Yamada | 358/80 |
| 4,445,138 | 4/1984 | Zwirn et al. | 358/166 |
| 4,477,833 | 10/1984 | Clark et al. | 358/80 |
| 4,481,532 | 11/1984 | Clark et al. | 358/80 |
| 4,511,989 | 4/1985 | Sakamoto | 358/80 |
| 4,561,016 | 12/1985 | Jung et al. | 358/80 |
| 4,626,903 | 12/1986 | Giesche et al. | 358/80 |
| 4,717,954 | 1/1988 | Fujita et al. | 358/80 |
| 4,752,822 | 6/1988 | Kawamura | 358/80 |

FOREIGN PATENT DOCUMENTS

| | | |
|---|---|---|
| 0084228 | 7/1983 | European Pat. Off. |
| 56-51742 | 5/1981 | Japan ........................ 358/80 |
| 57-198463 | 12/1982 | Japan ........................ 358/80 |
| 58-24457 | 2/1983 | Japan ........................ 358/80 |
| 8103097 | 10/1981 | PCT Int'l Appl. |
| 8202637 | 8/1982 | PCT Int'l Appl. |
| 8300593 | 2/1983 | PCT Int'l Appl. |

OTHER PUBLICATIONS

MacAdam, D. L., *Color Measurement-Theme and Variations*, Springer-Verlag, 1981, First Page of Chapter 8–Color Differences.

Wyszecki, Günter et al, *Color Science-Concepts and Methods, Quantitative Data and Formulae*, 2nd Edition, John Wiley & Sons, 1982, pp. 138 and 164–167.

(List continued on next page.)

Primary Examiner—James J. Groody
Assistant Examiner—Randall S. Svihla
Attorney, Agent, or Firm—Lahive & Cockfield

[57] ABSTRACT

A color transform enables color-image information to be recorded, displayed and otherwise processed with exacting control of color relative to a selected display. Apparatus implementing the transform enables a single-exposure photographic print of image information produced in pre-press equipment to predict with accuracy an ink-on-paper print of that information. Color-image information is transformed with a technique that produces output information for each output color component or other parameter at each point in response to up to all input parameters at that point. The technique includes scaling, normalizing and linearizing steps, and may include selecting a uniform color space for mapping the color response of the object (film) medium with the color response of the reference (print) medium. The output information may include approximate transform values and finalizing values. The technique can be implemented for real-time conversion with look-up tables storing approximate transform values and storing interpolation factors, including gradient values, for computing finalizing values.

23 Claims, 3 Drawing Sheets

OTHER PUBLICATIONS

Pugsley, Peter, *Pre-Press Picture Processing in the Graphic Arts Industry*, IEEE Transactions on Communications, vol. COM-29, No. 12, Dec. 1981, pp. 1891–1897.

Chow, C. K. and T. Kaneko, *Boundary Detection of Radiographic Images by a Threshold Method*, Information Processing 71, 1972, pp. 1530–1535.

Rajala, S. and R. Figueiredo, *Adaptive Nonlinear Image Restoration by a Modified Kalman Filtering Approach*, ICASSP 80 Proceedings–IEEE Int. Conf. on Acoustics, Speech and Sig. Proc., vol. 2, pp. 414–417.

Bernstein, R., *Digital Image Processing of Earth Observation Sensor Data*, IBM Journal of Research & Development, vol. 20, No. 1, Jan. 1976, pp. 40–57.

McCann, J. et al, *Retinex Processing of Natural Images*, The Association for Research in Vision and Opthalmology Incorporated, Annual Spring Meeting, May 1980.

McCann, J., untitled paper Inter-Society Color Council, Symposium on Chromatic Adaptation, Feb. 1980.

Tajima, J. et al, *Color Analysis by Color Information Processing System* (CIPS-1), NEC Research & Development No. 47, Oct. 1977, pp. 13–18.

METHOD OF AND APPARATUS FOR TRANSFORMING COLOR IMAGE DATA ON THE BASIS OF AN ISOTROPIC AND UNIFORM COLORIMETRIC SPACE

BACKGROUND

This invention relates to the transformation of image information for the accurate recordal, display and other processing of a color image. The transformation is particularly advantageous for the exacting reproduction of color image information on photographic film.

The invention further relates to the conversion of color-image information to a photographic record, with exacting control of color relative to a selected display.

The invention makes possible, for example, the preparation of a full-color photographic pre-press proof, with a single exposure, from page-makeup equipment as conventionally used in the graphic arts industry. The proof is of such exact quality, especially with regard to color, that it accurately predicts the appearance of an ink-on-paper printed reproduction of the same image information. Further, the invention enables the photographic proof to be produced with a high degree of automation, and hence with minimal operator involvement.

Photographic color media have heretofore often been deemed unacceptable for reproduction of color image information. A pre-press proof, for example, conventionally is prepared according to a relatively slow and costly Chromalin procedure with different black-and-white separations. Similarly, photographic media have often been deemed unacceptable for preparing an exacting record of color video image information, as commonly displayed on a television monitor.

It is understood that this perceived inadequacy of photographic media for proof quality and other exacting reproductions of color image information stems at least in part from the supposed inability of photographic color media to reproduce the complex, multiple-parameter color space of available printing inks and of other graphic display media.

There are other reasons why a print or other display of color image information stored in digital form may appear significantly different from the original scene. One is that the optical scanner or other input device which encodes the original scene, and the output device, as well as the printing or other display medium, e.g. television, do not necessarily process color values faithfully.

Various schemes have been employed to correct for degradation in prior digital color transformation of image information. U.S. Pat. No. 3,893,166 discloses a color correction system in which a computer transforms image information for graphic arts reproduction, after an operator has adjusted color-parameter controls of the computer. The article entitled "Pre-Press Picture Processing In The Graphic Arts Industry" by Peter C. Pugsley, IEEE Transactions on Communications, Volume CON-29, No. 12, December 1981, pp. 1891–1897, discusses color correction in the conversion of red-green-blue (RGB) input signals to cyan-magenta-yellow-black (CMYK) output signals. The conversion employs a multi-dimensional look-up table and a digital interpolator. The conversion data for the lookup table is recomputed from color parameters entered by the operator. European Patent Application Publication No. 0084228 (published July 27, 1983) discloses a system of nine look-up tables for modifying a three-color RGB input to a like output.

Aside from the noted media problem, the accurate transformation of color-image information to a selected display has been difficult in part because each color component influences other color components, and because transformation has required storing and processing the vast quantities of information in a color image. In particular, each pixel of a color image is commonly encoded into three or four constituent color components. Each color component is commonly defined with an eight-bit computer word and hence with one of two hundred and fifty-six values. Three components are common for the RGB additive color system, and four components are used for the CMYK subtractive color system. Television, for example, uses the additive system, whereas commercial printing commonly employs the subtractive system.

The color at any pixel of an image may be a function of all the color components. Hence, the values of three or four eight-bit bytes jointly specify the exact color of each pixel in an input image. There thus are either $256^3$ (sixteen million) possible input color values at a single pixel, or $256^4$ (four billion) such values. The output representation of the pixel involves a like number of values. Thus, a transformation for photographically printing color images obtained in a printing process may receive four input bytes, i.e. C, M, Y and K values, per pixel and produce three output bytes to define the R, G, and B values for that pixel.

The storage of conventional conversion data for this number of values exceeds the capabilities of present competitive commerical equipment. Further, storing a lesser, representative number of conversion values and interpolating between the representative values has required excessive computation time, even with a high speed main-frame computer. In addition, prior color correction of the kind illustrated by the first two publications noted above requires color perception and adjustment by an operator.

It accordingly is an object of this invention to provide a method and apparatus for the improved recordal of color-image information on a photographic medium with substantially exact control of color relative to a selected other display medium. A further object is to provide equipment that effects such image recordal with a high degree of automatic operation.

It is also an object of this invention to provide color-image transformation from one image-display medium to another which accounts for multiple medium-dependent artifacts and which yet can be practiced with competitive automated equipment.

It is a further object of the invention to provide a full multi-dimensional image transformation which produces each output parameter at a given pixel in response to all input parameters at that point. Information for an RGB image, for example, has three color components and hence has three such parameters.

It is also an object of the invention to provide a transformation of the above character in which the transformation data can readily be changed. This is desirable because an exacting transformation is based on calibrations of both the image-encoding input system and of the printing or other display output elements, e.g., recorder and film. The transformation of this invention accordingly can be changed when the properties of an input component or of an output component are altered.

A more particular object of the invention is to provide a color transformation of the above character that can be performed as part of a pre-press graphic arts operation. The transformation is to receive color-image input formation in a conventional manner with existing input equipment, and transform it for recordal with existing output equipment.

It further is an object of the invention to provide color transformation of the foregoing character that can readily be incorporated into existing graphic arts and other image-processing equipment.

Another object of the invention is to provide color transformation of the above character that can be practiced on a real-time basis with current commercial equipment.

Other objects of the invention will in part be obvious and will in part appear hereinafter.

SUMMARY OF THE INVENTION

A method according to the invention for determining a transform of color image information for the recordal of the information on a selected object medium with control of color relative to a selected reference medium includes mapping the color response of the object medium according to a selected colorimetric color space with the color response of the reference medium according to the same color space.

The method preferably includes scaling each color response on a common basis prior to effecting the mapping step. The scaling step according to the invention includes normalizing each color response according to a relative maximal response of that medium, e.g., normalizing the color response of each medium according to a maximal brightness attainable on that medium. The scaling step further includes scaling a selected range of color responses attainable on the object medium with reference to a selected range of color responses attainable on the reference medium.

In further accord with the invention, each color response is determined according to a common color space that is substantially isotropic throughout a selected gamut, and the mapping is performed with a substantially linearized response of each medium to the selected color space.

The invention further provides a method for determining a transform of color image information for the recordal of the information on a selected object medium with control of color relative to a selected reference medium. This method also includes calibrating the color response of the object medium and the color response of the reference medium on a common basis over a selected gamut, and mapping the calibrated color response of the object medium with the calibrated color response of the reference medium. The calibrating operation includes determining each color response according to a common color space and scaling each color response substantially identically. The scaling operation preferably includes normalizing the color response of the object medium with reference to a maximal brightness attainable with that medium relative to a maximal brightness attainable with the reference medium. The scaling step further includes scaling a maximal range of color responses of the object medium with a maximal range of color responses of the reference medium. The preferred calibration of each medium is with reference to the same colorimetric and isotropic color space and according to a substantially common linear basis.

Equipment according to one embodiment of the invention provides a photographic record of digital color information, with substantially exact color control relative to a selected other display medium, i.e., relative to a reference medium. The equipment implements a direct hardware computation of a relatively complex high-order image-transforming calculation, yet the implementation has a high degree of efficiency in terms of both computer time and required computer capacity.

The invention attains these and other advantages in reproducing and otherwise displaying color image information by providing an exacting transform of color image information and by providing an easily practiced implementation of the transform.

A feature of the transform is that it can produce each output color component in response to all input color components. The color transform thus has the feature that each RGB or CMYK value in the transformed image information is responsive to each color component of the given information in the presence of at least one other color component. In the ideal, highest quality system, the transformed numeric value of each color component is responsive to the numeric value of each given input color component as determined with reference to every other given color component. This capability of the transform to account for the multiple interdependency of color components enables it to produce image information that, when printed, provides exacting color rendition.

Thus, a further feature of the color transform is that it can produce output image information that can be reproduced on a medium, e.g., photographically printed, to yield an exacting display of how the same input information will reproduce on a different medium, such as by ink printed on paper. The prior-art attainment of this goal, as in a conventional proof system, suffers significant shortcomings.

Another feature of the color transform which the invention provides is that it can be practiced with relatively few arithmetic computations and hence with relatively simple computer equipment and in relatively brief time. A preferred implementation of the transform, which the invention also provides, transforms input information to desired output information by determining, for each color component, an approximate transform value to which are added finalizing values. Each approximate transform value can be a function of all input color components, and the finalizing values can likewise be responsive to all input color components.

Computer equipment can implement the color transformation by storing a conversion table with the approximate transform values for all combinations of input values, and by storing a table of factors for computing the finalizing values. The equipment can readily be updated, for a change in a system or media component, simply by changing the contents of the data tables.

A color transform according to the invention is determined by a mapping of two color responses. One color response is for the photographic or other medium, herein termed an object medium, on which the transformed information is to be displayed, e.g., recorded or printed. The other color response is for a medium, termed a reference medium, on which the information is also to be displayed and against which the object display is to be compared. The color transform thus is determined, in a general manner, by mapping the color response of the object medium, according to a selected color system, with the color response of the reference medium according to the same color system.

The two color responses are, in instances where exacting color reproduction on the object medium is desired relative to the reproduction on the reference medium, calibrated prior to the mapping operation. One aspect of the calibration, in further accord with the invention, is that the selected color system is a colorimetric color space. The color space in addition preferably is isotropic. The calibration preferably also includes scaling and linearizing the two color responses. The scaling operation includes scaling an extreme color condition, e.g., maximum whiteness, and scaling color ranges. That is, the scaling operation involves normalizing the color response of the object medium according to the maximum brightness it can reproduce relative to the maximum brightness that the reference medium can reproduce. This operation scales the background color of the object medium e.g., maximum whiteness it can reproduce, to the corresponding extreme color of the reference medium. The operation is performed independently for each color component, for example using measurements made with a red-sensitive detector, a blue-sensitive detector and a green-sensitive detector. This normalizing of the physical media preferably is performed prior to scaling the color range of the media.

The scaling of color ranges involves a substantially continuous scaling, over a selected gamut, of the color range of the object medium with the color range of the reference medium. The reference medium may, for example, be a selected television monitor or a selected printing system. This scaling of color ranges enables the selected photographic or other object record to reproduce color variations present in the given information with exacting correspondence to the response of the reference medium to that same given image information.

The mapping of the two color responses, particularly when calibrated in the foregoing manner, provides a transform of essentially every digital value of the given image information to an output value which the selected object medium records with strikingly close exactness to the response of the reference medium to that same given color information.

The mapping of the two color responses is performed by measuring the color response of each medium, i.e., of the selected object medium and of the selected reference medium, with reference to the same color space. This color space, i.e., the coordinate system for specifying color, is selected to be colorimetric. It hence is based on international standard for human color matching. The color space preferably is also istropic, so that distance in any direction within the space is a measure of difference in color appearance. A preferred example is a color space in which equal spatial increments produce corresponding equal increments in visual appearance. The Uniform Color Space (UCS) of the Optical Society of America is an example of one color space for preferred practice of the invention.

The mapping between the two color responses in addition is performed throughout the color space, rather than along only the axes or borders. This feature provides an exacting transform for colors with different values of hue and of saturation throughout the color space. It thereby enables the transform to accommodate, with continued high exactness, interimage effects of different constituent colors as are present, for example, in photographic media.

A preferred practice of color transformation in accordance with the invention also features performing the foregoing mapping between substantially linearized color responses. That is, the color response of the selected object medium to the digital color scale is linearized so that equal differences in color information produce approximately equally spaced perceived colors. The color response of the reference medium is linearized in the same manner, and it is the color responses as thus linearized which are mapped to attain the desired color transform. This linearization of the two display media, which is part of the above mentioned calibration of the media, improves the degree with which the resultant transform reproduces image information on the object medium with a high degree of exactness relative to the reference medium. It also enhances the practice of the invention on a real time basis and reduces the complexity of the required computer.

It is also a feature of the invention to implement the foregoing transform in two stages, the first of which converts the multiple component, e.g., three-color or four-color, input information at each pixel to a separate approximate transform value for each output color component. Thus, a transform from RGB components to CMYK components produces, for each pixel, an approximate cyan value, an approximate magenta value, an approximate yellow value, and an approximate black value. Each approximate value is, in an exacting practice of the invention, a function of all input color components at that pixel. For example, each approximate output value is responsive to a high order, more significant, measure of the RGB values at the given pixel.

The second stage of the transform implementation augments the approximate transform value of each output component with additional finalizing values determined for many, if not all, input components. Each finalizing value preferably is an interpolation value determined for the image point, i.e., pixel, being valued. Further, each interpolation value accounts for the difference between the value of an input component at the selected approximate transform value and the actual value of that input component. A preferred interpolation value is the product of a low order, les significant, measure of the value of each input component, and an interpolation factor for that component at the high order value where the approximate transform value is selected. Each interpolation factor is responsive, in the preferred highest accuracy practice of the invention, to all input color components.

The implementation of a color transform according to the invention thus transforms representative high order measures of the set of input color components at a pixel to an approximate transform value for each output color component, and corrects the approximate transform values with finalizing interpolation values.

The finalizing values account for the differences in the approximate transform value between the representative input measures. The finalizing values, moreover, ideally account for such differences with respect to each input component. That is, for greatest transformation accuracy, each finalizing value is responsive to the change, e.g., slope, of the approximate transform value with respect to one input color component at the corresponding input point. However, the invention can be practiced using finalizing values determined with respect to fewer than all input components. This is the case, for example, where a specific input component has relatively little impact on an output component and hence can, to a first approximation, be disregarded. Finalizing values measured with respect to fewer than all input components can also be used where less exactness is required in the output image, at least with regard to a selected component.

One image transformation system for implementing the foregoing color transform stores, for each output component, a table of approximate transform values for selected representatively-valued sets of input color components, and stores interpolation factors of the approximate transform values. Storing the latter data saves the system significant computational time otherwise required for interpolation. Each interpolation factor is preferably stored as the gradient of one output component, at the selected approximate transform value, with respect to one input component. Each such interpolation factor is thus the slope of the curve of the output component with respect to one input component.

More particularly, a preferred transform system according to the invention applies high order, more significant measures of all input color component values to a separate transform look-up table for each output component, to produce an approximate transform value for each output component. The system addresses tables of interpolation factors for the approximate transform values with high order measures of the input component, to locate, for each output component, one or more interpolation factors. The system multiplies each interpolation factor by a low order, less significant measure of that input component. The resulting product is the interpolation value of an output component with respect to that input component. The system sums the approximate transform value for each output component with interpolation values of that output component. The summed value is the desired output value for that component at the given image point. The computation which this implementation executes thus only involves, aside from the table look-up operations, a few two-quantity multiplications and several additions.

The approximate transform values and the interpolation values that the system stores can readily be changed. This enables the system to provide exacting color conversion under different conditions; for example, for output images recorded on different types of photographic film or with photographic film manufactured under different conditions that affect color response. Further, the transform system can convert all input components for one image point to output components in parallel, i.e. concurrently. This operation, in lieu of serial operation, shortens the computation time.

Features of the invention thus include, in addition to those noted previously, producing the value of each parameter, i.e., color component, of an output pixel set in response to all input parameters at the corresponding input pixel. An image represented, for example, in the CMYK system has four parameters for each pixel, whereas an image produced with the RGB color system has three parameters for each image pixel. The implementation which the invention provides of this transform further features producing the value of each output-pixel parameter in response to an approximate transform value of that parameter responsive to measures of all input parameters and further in response to finalizing values for that output parameter.

The approximate transform value for each output parameter preferably is selected in response to an approximate representative high order or other more significant measure of the input parameter. The finalizing factors for that parameter also are selected in response to like, if not the same, high order, more significant measures of an input parameter. However, the measure of the input parameter by which a selected finalizing factor is multiplied, to produce a finalizing value, is a low order, less significant representation of that input parameter.

In a preferred practice of the invention, the finalizing factors for a given set of approximate transform values are computed and stored in a manner such that accessing or otherwise addressing any approximate transform value also accesses or addresses all finalizing values for that approximate transform value. This storage of previously-computed factors saves computer time. Yet another preferred practice is that each finalizing value is computed with an interpolation factor that is a gradient measure with respect to one input parameter at the selected approximate transform value.

These and other features of the invention can be realized in terms of electronic computational trans-form systems employing either digital or analog logic or a combination thereof. Further, the features can be realized in a method of effecting such a transform. The transformation, moreover, can be applied to analog signals and to digital signals.

A transform having the foregoing features, characteristics and improvements can be implemented on a real-time basis and with a relatively small assemblage of presently-available logic circuits. The transform can be implemented to require relatively few and simple computations for determining the value of each output parameter. These simplifications of the transform enable it to be implemented, for example, with a digital transform system operating on a real time basis with a high speed printer, such as a digital film recorder.

The invention accordingly comprises the several steps and the relation of one or more of such steps with respect to each of the others, and the apparatus embodying features of construction, combinations of elements, and arrangements of parts which are adapted to effect such steps, all as exemplified further in the following detailed disclosure, and the scope of the invention is indicated in the claims.

For a fuller understanding of the nature and objects of the invention, reference should be had to the following detailed description taken in connection with the accompanying drawings, in which:

FIG. 5 is a flow chart depicting the operations executed in the implementation of a color transform in accordance with the invention.

DESCRIPTION OF ILLUSTRATED EMBODIMENTS

Figure 1:
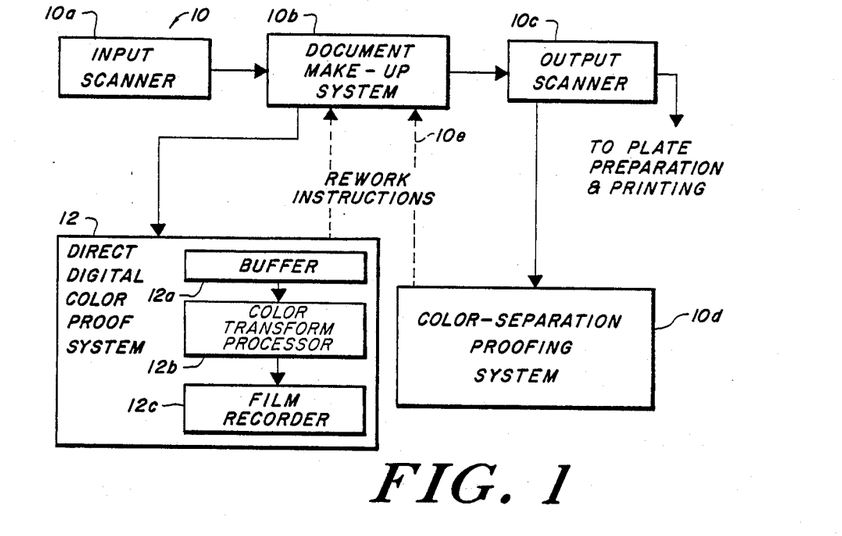
FIG. 1 is a block schematic diagram of pre-press equipment having a direct color proof system embodying features of the invention.

FIG. 1 shows pre-press equipment 10 having a direct proof system 12 in accordance with the invention. The equipment has, as conventional, an input scanner 10a that applies digital color image information to a document makeup system 10b. The input scanner 10a typically produces the digital image information by optically scanning an original image, which typically is a document or a scene. The makeup system 10b stores the image, i.e., graphics and text information, in digital form and provides for interactive manipulation of the text and image material for assembling, in a typical instance, complete document pages. The resultant assembled information typically is in digital form. The makeup system may, by way of illustrative example, be a page makeup system as marketed by Scitex America Corporation of Bedford, Mass.

The makeup system 10b applies the formatted information to an output scanner 10c, for the preparation of color separation films that in turn are used to prepare printing plates. A proofing system 10d in the pre-press equipment 10 is connected with the output scanner 10c for preparing a proof of the information used in preparing the printing plates. The proofing system employs different black and white separations as used, for example, in the known Chromalin proof procedure. FIG. 1 indicates with a dashed line 10e that the appearance of the proof prepared in this manner to the human operator enables the operator to adjust the document makeup system 10b. The operator's rework instructions thus modify the digital information to provide editing, color rendition, or other changes in the document being prepared.

The direct color proof system 12 that the invention provides for the pre-press equipment 10 is illustrated as connected with the makeup system 10b for receiving the formatted document information that it stores. The proof system 12 transforms the image information for photographic reproduction, and produces a photographic print. The color transform enables the print to be prepared in a single full-color exposure and to be a substantially exact reproduction of the image information as it will appear when finally printed with plates prepared using color separations from the output scanner 10c. That is, the proof system 12 calculates the exposure for the selected photographic medium that will match the ink on paper printing using the color separations from the output scanner 10c. The proof system 12 exposes and processes the photographic medium to provide the photographic print in minutes and directly from the digital image file in the makeup system 10b.

The direct proof system 12 includes a buffer 12a, a color transform processor 12b and a film recorder 12c. The buffer 12a stores digital image information received from the makeup system 10b. The transform processor 12b processes the stored information according to a color transform that calculates the photographic exposure that will match the same ink on paper printing for which the output scanner 10c prepares color separations. The color transform takes into account such factors as the spectral characteristics of the pigments in the printing inks, the sensitizers in the photographic film, the dyes in the photographic film, the filters in the input scanner 10a, and the illumination in the film recorder 12c. In addition, the color transform can incorporate corrections for dot gain in a printing press, for variability in photographic film, and for the spectral emissions of the illuminants involved.

The film recorder 12c exposes a selected photograhic film in response to the processed image information. The film recorder 12c can, for example, employ a recorder as marketed by MacDonald Dettwiler Associates and marketed under the designation MDA Color-Fire 240.

With further reference to FIG. 1, the color transform which the processor 12b implements is structured to produce, on the photographic medium selected for the film recorder 12c, the same color which the specified printing process produces with the information output from the scanner 10c. At each point or pixel in the image which the pre-press equipment 10 is processing, the color is determined by a set of digital words, of which there are three in an RGB system and four in a CMYK system. The color transform thus provides a correspondence between a first set of digital words, i.e., a first digit set, which the processor applies to the film recorder 12c, and a second digit set which the make-up system 10b applies to the output scanner 10c. The correspondence is with a high degree of exactness such that the two digit sets produce identically appearing colors on the photographic print from the recorder 12c and on the ink-on-paper or other print that ultimately results from the output scanner 10c.

The invention provides such a color transform between the photographic medium or, more generally, a selected object medium, and the print or other reference medium in the following manner. First, a linear color response function of the object medium, e.g., the photgraphic film, is determined. The response function is linear in the sense that a two-dimensional graph of the function, in which color response is plotted as a function of applied digit set, has equal differences along the digit axis correspond with roughly equally spaced colors along the other axis. This linearizing, medium-calibrating step is deemed optional and preferred. Advantages which it provides include simplifying the determination of the color transform and simplifying the implementation and application of the color transform in the transform processor 12b.

The next step in structuring the color transform is to determine a transfer function of the linearized color response for the object medium to a selected color space. This step provides an exact measure of the "color" produced by each digit set. The color measurement is based on a reference system, i.e., color space, which is colorimetric and preferably is substantially uniform or isotropic, so that the perceptual distance between colors is well represented by geometric distance within the space. The Optical Society of America Uniform Color Space (UCS) is an example of a suitable coordinate system for specifying color. The text "Color Science: Concepts and Methods, Quantitative Data and Formulae" by Wysecki and Stiles; John Wiley & Son, Inc. (1982); gives other examples of a suitable color-specifying coordinate system. The desired transfer function of the linearized color response for the object medium relative to the color space can, in one preferred instance, be computed by first determining the transfer function for discrete sampled digit sets to provide a discrete transfer function. Numerical techniques, such as a Fourier expansion technique, are used to extend the discrete function, i.e., from the sampled points, to a continuous function. The resultant continuous transfer function predicts the color, as measured on the selected color space, which the object medium produces in response to any applied digit set.

The structuring of the desired color transform in accordance with the invention provides a similar continuous transfer function of a linearized color response for the reference medium to the same selected color space. This second, reference transfer function can be produced in the same manner as the first, object transfer function, i.e., by determining a linear color response function of the second medium, determining a discrete function of that linearized color response to the selected color space, and extending the discrete function to a continuous function.

The foregoing linearization and transfer function-creating operations in effect calibrate both the selected object medium and the selected reference medium on a common linear basis and with reference to a common color measuring system as represented by the selected color space.

The desired color transform is the result of a mapping between the two medium-calibrating transfer functions. The mapping may be constructed initially on a discrete basis that is extended to a continuous basis. Thus, for each of a set of sampling digit sets of the reference medium, the corresponding digit set of the object medium is determined. This mapping may be obtained by following each sampling digit to the color which it produces according to the transfer function for the reference medium, and then inverting the transfer function for the reference medium at that color value to find the corresponding digit set of the object medium. The discrete mapping as thus determined on a sampling basis is readily extended to a continuous function, again typically using a Fourier fitting technique. The resultant continuous mapping, which is one form of the desired color transform, can predict the digit set of the object medium that corresponds to an arbitrary digit set applied to the reference medium.

A preferred implementation of the transform processor $12b$ as noted above, and as further described with reference to the embodiments of FIG. 3 and 4, evaluates the continuous mapping derived in the foregoing manner at a lattice of selected representative points in the reference medium to create a transform table of approximate values, and to create a further table of interpolation factors. The resultant data base is stored in the transform processor $12b$, as described further below.

A color transform as described above of a set of RGB input values to a set of RGB output values according to the invention can be represented in terms of the following three-dimensional mathematical expression labelled Eq. I. In this equation, the input values at a single point or pixel of the image are designated $R_{in}$, $G_{in}$, and $B_{in}$. The symbols $p_r$, $p_g$, and $p_b$ represent the high order, more significant measures of the input values $R_{in}$, $G_{in}$, and $B_{in}$, respectively. The symbols $q_r$, $q_g$, and $q_b$ similarly represent the low order, less significant measures of the same input values. Each delta symbol represents an interpolation factor. For example, $\Delta r_r$ represents the interpolation factor for a red output component with respect to a low order red input value. The desired output values are designated $R_{out}$, $G_{out}$, and $B_{out}$.

$$\begin{pmatrix} R_{out} \\ G_{out} \\ B_{out} \end{pmatrix} = \begin{pmatrix} R_{out}(p_r, p_g, p_b) \\ G_{out}(p_r, p_g, p_b) \\ B_{out}(p_r, p_g, p_b) \end{pmatrix} + \begin{pmatrix} \Delta r_r + \Delta r_g + \Delta r_b \\ \Delta g_r + \Delta g_g + \Delta g_b \\ \Delta b_r + \Delta b_g + \Delta b_b \end{pmatrix} \begin{pmatrix} q_r \\ q_g \\ q_b \end{pmatrix} \quad \text{(Eq. I)}$$

Each term of Eq. I in the first array to the right of the equal sign, i.e., the one-dimensional array, is an approximate transform value for a given output color component, i.e., red, green or blue, and is a function of the most significant measures of all input color components.

Each product term obtained by multiplying the two arrays on the right of the plus sign represents an interpolation value for the designated output color component. This interpolation value is a function of less significant measures of all three input color components and of an interpolation factor that measures the change in the approximate transform value with respect to one designated input color component.

Equation I is expanded as follows to express, for example, the value of $G_{out}$:

$$G_{out} = G_{out}(p_r, p_g, p_b) + (\Delta g_r \cdot q_r + \Delta g_g \cdot q_g + \Delta g_b \cdot q_b) \quad \text{(eq. II)}$$

Figure 2:
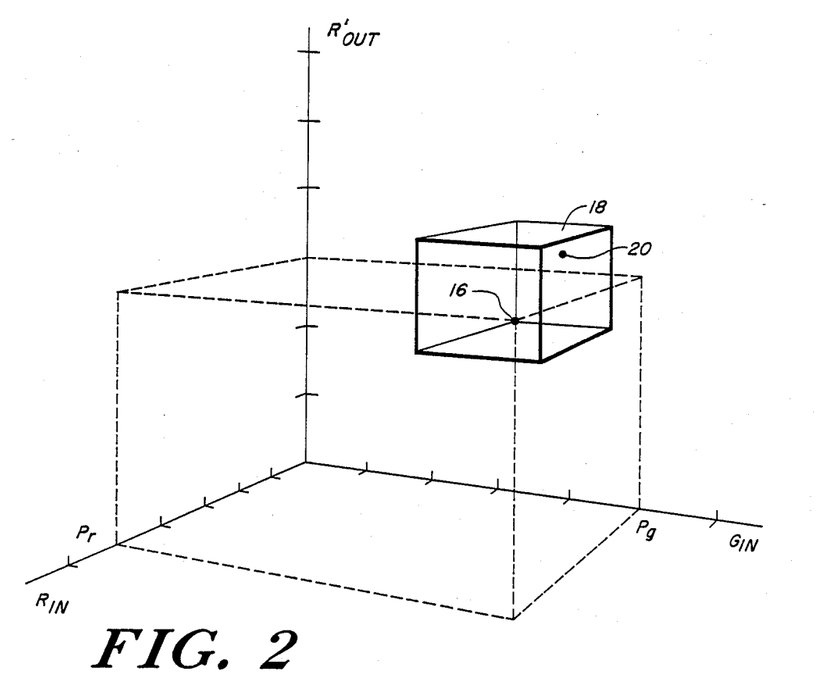
FIG. 2 illustrates features of the invention with reference to a three-dimensional color space.

FIG. 2 represents a three-dimensional space having the coordinates $R_{in}$, $G_{in}$ and $R'_{out}$. The drawing illustrates the determination of the value of one output parameter, illustrated as red-out in accordance with Equation I. The illustrated determination is partial, in that it is a function of only two input parameters, namely, the red and the green input values. A single graphical representation of $R_{out}$ as a function of all three input color components involves a four-dimensional space and is not readily illustrated. Hence the quantity $R'_{out}$ represents a partial red-out value, namely the value of the red output component as a function only of the input red and green components. A further determination not shown in FIG. 2 is required to account for the input blue component.

FIG. 2 designates the selected representative high order, more significant measures of the input red and green parameters, which determine the approximate partial red-out transform value in accordance with Equation I. The designations are uniformly spaced scale markings on the two coordinate axes $R_{in}$ and $G_{in}$.

The approximate partial transform value of $R'_{out}$ for the illustrated two input components corresponds in the three-dimensional space to the third coordinate of a point 16. The other two coordinates of this point are the high-order values $p_r$ and $p_g$.

The illustrated $R'_{out}$ point 16 is at one corner of a three-dimensional cell 18, each side of which is parallel to one coordinate axis and corresponds in length to an interval between successive representative high order measures. The illustrated point 16 is at the corner of the cell 18 closest to the origin of the coordinate space. The illustrated partial color response space of FIG. 2 has a uniform increment between successive representative values along the two input axes $R_{in}$ and $G_{in}$. Hence the cell 18 has a square base with a center that can be represented as having two coordinates at $(p_r + \frac{1}{2})$, and at $(p_g + \frac{1}{2})$.

The interpolation for the approximate partial transform value $R'_{out}$, i.e., the sum of two of the three interpolation values for $R_{out}$ as expressed in Equation I, represents a point 20 within the cell 18 in the space of FIG. 2.

The interpolation factors for the partial red-out value, i.e., corresponding to the delta ($\Delta$) terms in Equation I, are preferably determined as the gradients of the red output component, at the selected red-out point 16, relative to different input color components. Thus, each factor is a partial derivative of red-out with respect to one input color component.

The interpolation factors for a complete red-out transform, rather than for the partial transform that FIG. 2 illustrates, may be determined according to the following mathematical expressions, which have the form of a discrete Taylor expansion. A partial derivative in the color response space forms the difference of the function at the cell boundaries in the active input component with the other input component held constant at the value at the mid-point of the cell. This determination improves the continuity of the approximant which the following equations represent for the interpolation factors.

$$\Delta r_r(p_r, p_g, p_b) = R_{out}(p_r+1, p_g+\tfrac{1}{2}, p_b+\tfrac{1}{2}) - R_{out}(p_r, p_g+\tfrac{1}{2}, p_b+\tfrac{1}{2}) \quad \text{(Eq. III)}$$

$$\Delta r_g(p_r, p_g, p_b) = R_{out}(p_r+\tfrac{1}{2}, p_g+1, p_b+\tfrac{1}{2}) - R_{out}(p_r+\tfrac{1}{2}, p_g, p_b+\tfrac{1}{2}) \quad \text{(Eq. IV)}$$

$$\Delta r_b(p_r, p_g, p_b) = R_{out}(p_r+\tfrac{1}{2}, p_g+\tfrac{1}{2}, p_b+1) - R_{out}(p_r+\tfrac{1}{2}, p_g+\tfrac{1}{2}, p_b) \quad \text{(Eq. V)}$$

Note that each transformation according to Equation I, as expanded for example in Equation II, requires only three multiplications and three additions. Further, a system that stores the conversion of the representative high order measures of the input color components to approximate transform values for each output parameter and that stores the interpolation factors, e.g., gradient measures, as illustrated above, can perform these few calculations rapidly. The system can determine high order and low order input color component measures directly from a given set of input signals, and can read all other numerical values directly from the stored data. The memory requirements for storing the data are unusually low for calculations of this type and are economically feasible and practical for a variety of applications.

Figure 3:
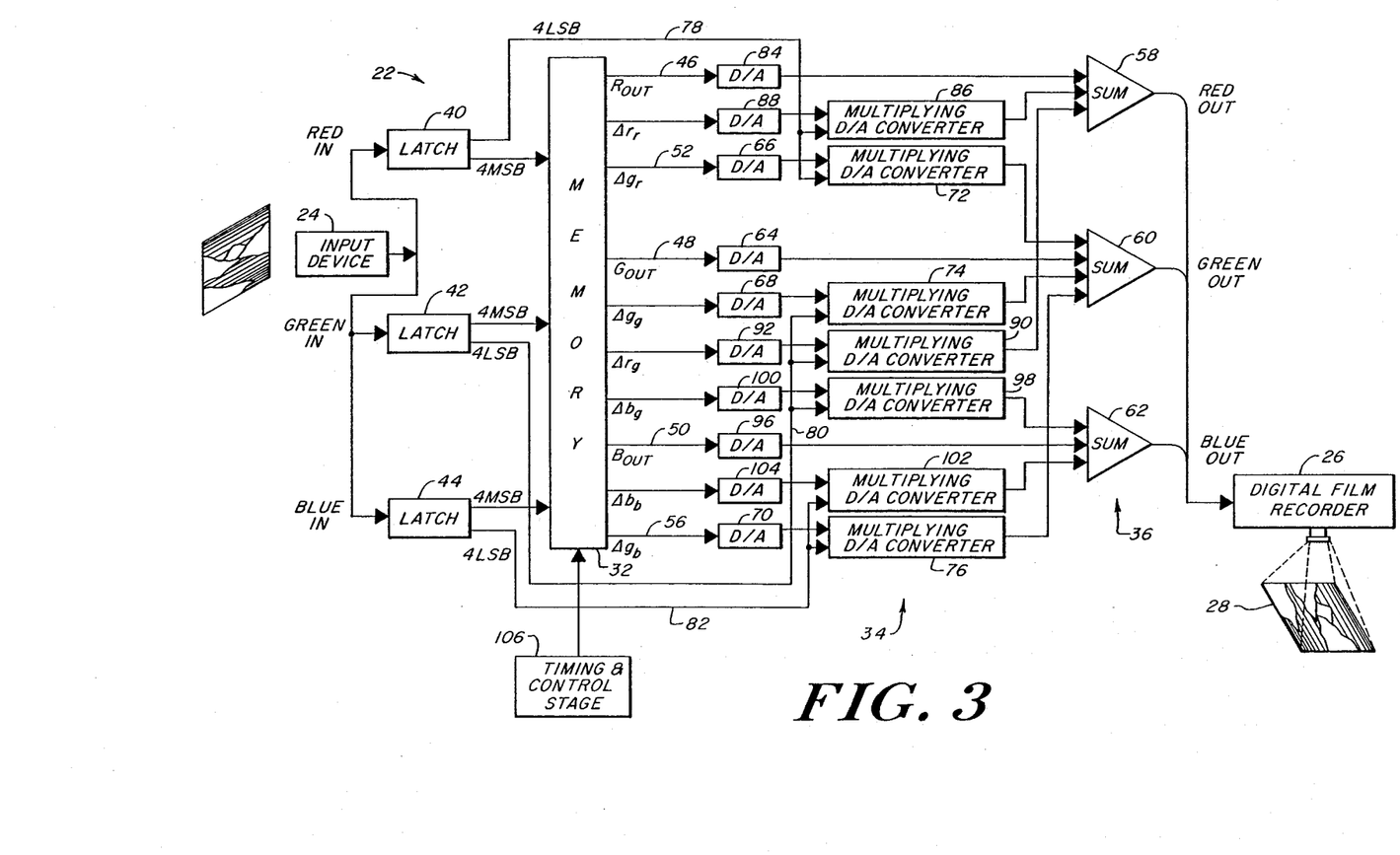
FIG. 3 is a block schematic representation of a digital color transform system according to the invention.

FIG. 3 shows color transform equipment 22 for implementing the transform of Equation I. One application of the equipment is in the direct color proof system 12 of FIG. 1, and it is described with reference to that operation. The illustrated equipment receives digital input information in the form of signals designated red-in, green-in, and blue-in from an input device 24. The input device, which can employ the document make-up system 10b or the input scanner 10a of FIG. 1, typically produces, as by optically scanning, or otherwise stores electronic signals that define an input image. The transform equipment produces output signals, termed red-out, green-out, blue-out, which an output device 26 records on a medium such as photographic film 28. The output device can employ the film recorder 12c of FIG. 1.

The illustrated transform equipment has a memory 32 that serves as a look-up table to provide the approximate transform values and to provide the interpolation factors used for the transform calculations as described above with reference to expressions I through V. The color transform data that the memory 32 stores is determined as described above by mapping the linearized color response of a selected reference medium. A multiplication stage 34 in the system multiplies an interpolation factor by a low order measure of an input color component to produce an interpolation value. A summing stage 36 sums each approximate transform value read from the memory 32 with interpolation values produced with the multiplication stage 34, to produce the output values.

More particularly, with continued reference to FIG. 3, a buffer stage of digital latches 40, 42 and 44 stores the digital red-in, green-in, and blue-in input signals respectively. The buffer stage, which can serve as the buffer 12a of FIG. 1, is connected to apply high order measures of the input signals to the memory 32 and to apply low order measures thereof to the multiplication stage 34.

The illustrated memory 32 stores a full set of approximate transform values of the red-out, green-out and blue-out color components for selected representative high order measures of the input signals. The stored approximate values thus correspond to a selected sampled set of all available ($R_{out}$, $G_{out}$, $B_{out}$) points in a three-dimensional color space. The memory 32 in addition stores interpolation factors for interpolating between successive sampled red-out values, between successive sampled green-out values, and between successive sampled blue-out values. As described above with reference to Equations III, IV and V, the interpolation factors preferably are gradient values.

The illustrated transform equipment of FIG. 3 uses the four most significant, high order digits of the digital signals as the high order, more significant measure of each input color component, and uses the four least significant, low order digits as the low order, less significant measure of each input color component. Accordingly, the four most significant digits of each digital input signal in each latch 40, 42 and 44, are applied as an address input to the memory 32. The illustrated memory accordingly receives a twelve-bit address signal. This address signal identifies an approximate red-transform output value, an approximate green-transform output value and an approximate blue-transform output value, all of which are stored in the memory element. The memory element produces each output value on a different memory data line 46, 48 and 50.

The illustrated equipment corrects the approximate green-out signal, produced on memory data line 48, with interpolation factors for all input color components, i.e., according to $\Delta g_r$, $\Delta g_g$ and $\Delta g_b$ correction factors, that the memory 32 produces on data lines 52, 54 and 56, respectively.

The illustrated summing stage 36 employs three summing amplifiers 58, 60 and 62, each of which operates with analog input signals and produces an analog output signal. Accordingly, the system converts each digital quantity read from the memory 32 to an analog voltage. Thus, with continued reference to the green output section of the equipment, a D/A converter 64 receives the $G_{out}$ signal on line 48 and produces a corresponding analog voltage which it applies to the summing amplifier 60 that produces the green output signal. Three further D/A converters 66, 68 and 70 convert the three green interpolation factors to analog form, and apply corresponding analog signals to multiplying D/A converters 72, 74 and 76, respectively.

The other input to the multiplying converter 72 is the low order red input signal which the latch 40 applies to a line 78. The multiplying converter 74 similarly receives the low order green input signal from latch 42 on line 80, and the multiplying converter 76 receives the low order blue input signal from latch 44 on line 82. Each multiplying converter converts the product of the digital low order input signal and the analog interpolation factor which it receives to produce an analog signal identifying a correction value. The converter applies this correction signal to an output summing amplifier. Accordingly, the analog signals from the multiplying converters 72, 74 and 76 are applied as input voltages to the summing amplifier 60. In response to the four input signals it thus receives, i.e., the approximate green-out voltage and the three green interpolation voltages, the summing amplifier 60 produces a single green output voltage computed in accordance with Equation I. This green output voltage is the sum of an approximate transform value plus three interpolation values. Each interpolation value is measured with respect to one of the three input color components. Note that each interpolation value is a function of all three input color components at the sampling output value corresponding to the input component values.

The transform equipment illustrated in FIG. 3, by way of further illustration of the invention, interpolates the approximate red-out value only with respect to red and green, and interpolates the approximate blue-out value only with respect to blue and green. The system hence is suited for application where a low order change in the red input value has little effect on the blue output value and where, correspondingly, a low order change in the blue input value has relatively little effect on the red output value.

Accordingly, to produce the red output voltage, the summing amplifier 58 receives an analog approximate red-out transform value, which a D/A converter 84 develops in response to the corresponding digital value read from the memory 32, plus two analog interpolation voltages. A multiplying converter 86 produces one interpolation voltage in response to the product of the low order red input signal on line 78, and an analog red interpolation factor which a D/A converter 88 produces in response to a corresponding digital value read from the memory 32. The other interpolation voltage input to the summing amplifier 58 accounts for changes in the red signal due to change in the green input signal and is produced by a multiplying converter 90 in response to the low order green input signal on line 80 and a red interpolation factor in response to change in green. This factor is read from the memory 32 and is converted with a D/A converter 92.

Similarly, the approximately blue output transform value from the memory 32 on line 50 is converted to analog form with a converter 96, the output of which is applied to the summing amplifier 62. A green interpolation voltage is applied to the amplifier 62 by a multiplying converter 98 in response to the product of an interpolation factor, which is read from the memory element and converted to analog form with a converter 100, and of the low order green input measure on line 80. The summing amplifier 62 also receives a blue interpolation signal which a multiplying converter 102 produces in response to the product of a blue interpolation factor read from the memory element and converted with converter 104 and the low order digits of the blue input signal, on line 82.

The illustrated color transform equipment of FIG. 3 has a timing and control stage 106 that controls the operation of the memory 32 and of other elements to provide the foregoing operation. The connections of the timing and control stage 106 with all the elements of the transform equipment are not shown. The further construction of the illustrated equipment to implement Equations I-V can employ any of several commercial implementations, using available components arranged and operated according to known conventional electronic practices.

The transform equipment of FIG. 3 thus implements the transformation described above with reference to Equations I through V. The equipment illustrates that each output color component value is the sum of an approximate transform value and of interpolation values that are a function of plural input color component values. The system also illustrates, with the red and the blue output color components, that interpolation values associated with some input color components may, in some instances, be omitted from the sum that produces the output value without undue loss of precision. The equipment of FIG. 3 can, of course, be implemented to produce the red output value and the blue output value with three interpolation values, in the same manner as the system produces for the green output value. Note further that the equipment of FIG. 3 can produce all three output signals concurrently.

The memory 32, which can be a random access memory or a form of read-only memory, i.e., a RAM, ROM, PROM, EPROM, and the like, requires a relatively small storage capacity. Further, the equipment can perform the computations for producing each output signal, i.e., the multiplications and additions, concurrently and with commercially-available integrated circuit components. Moveover, the transform equipment can operate with an input device 24 and an output device 26 of conventional design; it does not impose new or unique requirements on either device.

Figure 4:
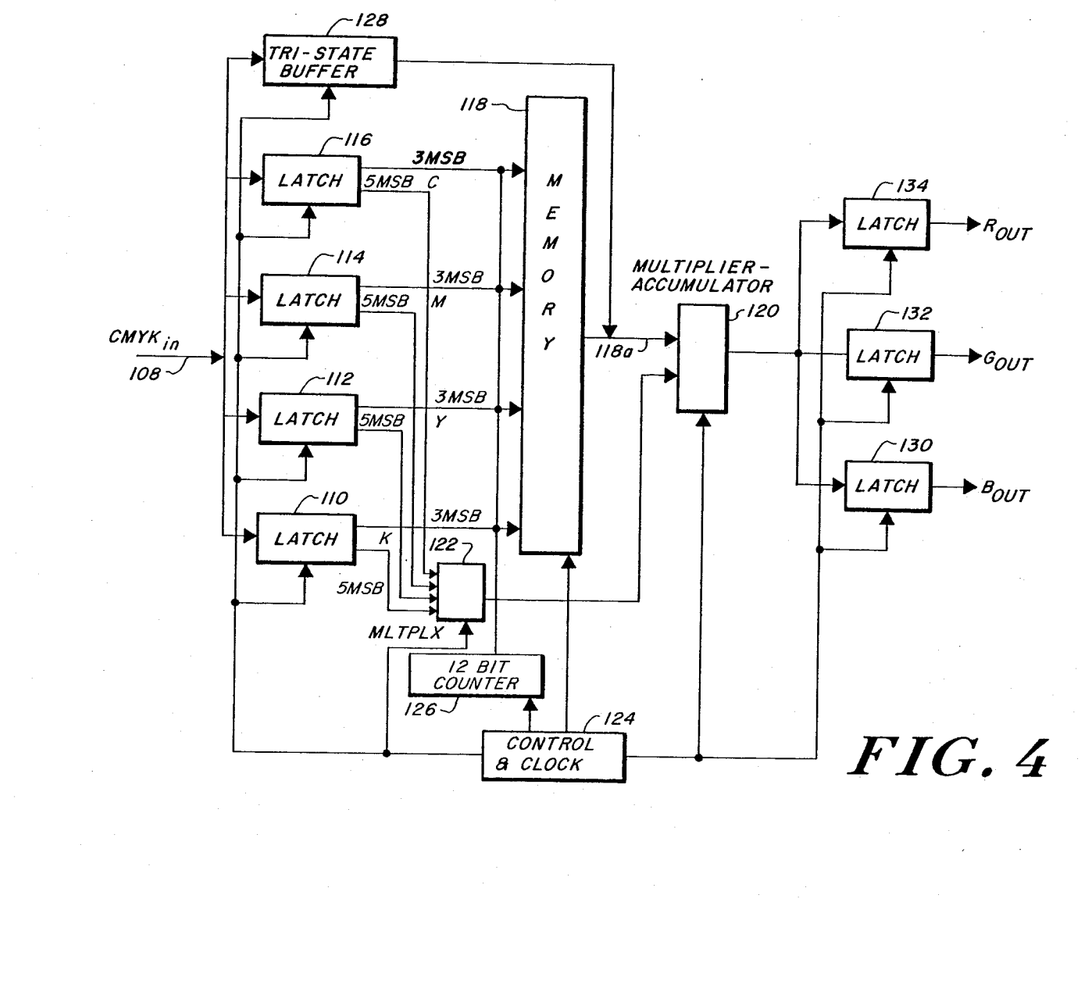
FIG. 4 is a block schematic representation of another color transform system in accordance with the invention.

FIG. 4 shows another embodiment of color transform equipment according to the invention for carrying out a transform as set forth in Equation I with input signals coded for the subtractive color system. The input signals for each pixel hence have four parameters, e.g., color components, namely, cyan, magenta, yellow and black, which, respectively, are designated with the letters C, M, Y and K. The equipment produces output signals coded according to the additive color system, i.e., having red, green and blue components. The transform for conversion of the CMYK input signals to RGB output signals according to the invention has the same form as Equation I, and each output value can be a function of all four input parameters. Similary, each output parameter can be interpolated with respect to each of the four input parameters, in place of three as in Equation I. Expansion of this transform equation for the green output, for example, yields Equation VI, which is representative of the equation for the red and the blue outputs.

$$G_{out} = G_{out}(p_c, p_m, p_y, p_k) + (\Delta g_c \cdot q_c + \Delta g_m \cdot q_m + \Delta g_y \cdot q_y + \Delta g_k \cdot q_k) \tag{Eq. VI}$$

The illustrated transform system receives eight-digit C, M, Y and K input signals in succession on a single input line 108 and stores each in a separate latch 116, 114, 112 and 110, respectively. The three high order digits of each eight-bit input signal identify the more significant measure of each input parameter value, leaving the five low order digits to identify the less significant measure of each input parameter value. The three high order digits of each input signal, i.e., a total of twelve digits, address a memory 118. The memory stores approximate transform values of each of the three output parameters for selected representative values of the C, M, Y, K input signals, and stores interpolation factors for interpolating between the selected representative approximate transform values. Each output value read from the memory is applied to a data-out line 118a which connects to a digital multiplier-accumulator computational circuit 120. The other inputs to the computational circuit 120 are the five-digit less significant measure of any one input signal as selected with a four-to-one multiplexer 122, and timing and control signals from a control stage 124. The control stage 124 also applies command signals to each latch, the multiplexer, a twelve-bit counter 126, the memory 118, a tri-state buffer 128, and each of three output latches 130, 132 and 134.

The computational circuit 120 forms each interpolation value as the product of an interpolation factor read from the memory and a low order measure of an input signal, in the manner set forth in Equation I, and sums the several interpolation values together and with an approximate transform value in the manner set forth in Equation VI. An output latch 130, 132, 134, selected by the control stage, stores the resultant computed output parameter value, for application to an output device.

Transformation data can readily be loaded into the memory element 118, and revised or otherwise updated, by way of the tri-state buffer 128 and the counter 126. The buffer connects from the system input line 108 to the memory data line 118a, for loading the memory element. For the memory loading operation, the tri-state buffer presents binary zero or binary one signal values to the memory data line 118a in response to signals it receives from the input line 108. Otherwise, the buffer presents a high impedance to the memory data line 118a, to provide high isolation between that line and the system input line 108 during the transformation operation of the system. The counter 126 connects to the memory address lines for addressing the memory element during the memory loading opeation.

The conversion system of FIG. 4 produces one parameter of an output signal at a time. More particularly, the single input line 108 successively applies each of the four different input signal parameters to all four latches, and the control stage 124 actuates one selected latch at a time to store an input signal. Thus, for example, the latch 116 stores input cyan signals, the latch 114 stores input magenta values, the latch 112 stores input yellow values, and the latch 110 stores input black values. The control stage selects the memory red operation with memory chip-select signals and in response to the twelve-bit address signal the memory receives from the input latches. In response, the memory 118 produces, in sequential order, an approximate output value, and up to four interpolation factors for each approximate transform value. Each interpolation factor is multiplied, in the computational circuit 120, by the corresponding low order input parameter measure as selected with the multiplexer 122 operating under command by the control stage. The accumulated output signal which the computational circuit 120 develops is stored in a selected one of the three latches, also under command from the control stage.

The transform equipment of FIG. 4 thus receives a set of C, M. Y, K input signals for a single pixel in serial sequence, and performs a color transformation to produce, for that pixel, a set of three output signals in the output latches 130, 132 and 134. The system determines each output signal as set forth in Equation VI. After producing and storing three such output signals in the three output latches, one for each output color component of a single pixel, the system receives input signals for another pixel of the input image.

The control stage 124 can update the transform data stored in the memory 118 in essentially the same manner. For this operation, an item of memory data received on the input line 108 is applied to the tri-state buffer 128. The control stage 124 operates the buffer to apply the data to the memory data line 118a concurrent with operation of the counter 126 for addressing the memory element to store that data item at the appropriate memory location.

Alternative to operation with a four component input signal structure, the system of FIG. 4 can transform three-parameter input signals to output signals simply by not using one input latch and by omitting all operations that otherwise involve the fourth input parameter.

A transform system as shown in FIG. 4 can be implemented with a memory 118 having a capacity of 64K bytes and with an eight-bit by eight-bit multiplier-accumulator computational circuit 120. The system can be implemented using standard static memories, conventional integrated-circuit computational circuits, and low power TTL logic circuits.

FIG. 5 is a block diagram illustrating certain operations executed in the implementation of a color transform in accordance with the invention. These operations can be executed by the transform equipment of FIGS. 3 or 4. The scaling, normalizing, mapping and calculation steps shown in FIG. 5 are discussed above in connection with FIGS. 1–4.

It will thus be seen that the equipment and method described above and illustrated in the drawings efficiently attain the objects set forth above, including the objects apparent from the preceding description. Since certain changes may be made in carrying out the above method, and in the constructions set forth, without departing from the scope of the invention, all matter contained in the above description or shown in the accompanying drawing is to be interpreted as illustrative and not in a limiting sense.

It is also to be understood that the following claims cover all of the generic and specific features of the invention herein described, and cover all statements of the scope of the invention which, as a matter of language, might be said to fall therebetween.

Having described the invention, what is claimed as new and secured by Letters Patent is:

1. A method for determining a transform of color image information for the recordal of transformed color image information on a selected object medium with control of color relative to a selected reference medium, said method comprising the steps of
   A. mapping a color response of said object medium according to a selected colorimetric color space with a color response of said reference medium according to said selected colorimetric color space, and
   B. normalizing said color response of said object medium with reference to a maximal brightness attainable therewith relative to a maximal brightness attainable with said reference medium.

2. A method according to claim 1 in which said normalizing step includes normalizing the color response of each said medium with reference to a maximal brightness attainable with that medium.

3. A method for determining a transform of color image information for the recordal of transformed color image information on a selected object medium with control of color relative to a selected reference medium, said method comprising the steps of
   A. selecting a colorimetric color space that is substantially isotropic and uniform throughout a selected gamut,
   B. determining a color response of said object medium according to said selected colorimetric color space and determining a color response of said reference medium according to said selected colorimetric and substantially isotropic color space, and C. mappping said color response of said object medium according to said color space with said color response of said reference medium according to said color space.

4. A method for determining a transform of color image information for the recordal of transformed color image information on a selected object medium with control of color relative to a selected reference medium, said method comprising the steps of A. calibrating a color response of said object medium and a color response of said reference medium on a common basis over a selected gamut, said calibrating step including determining each such color response according to a common color space and scaling each determined color response, said scaling including normalizing said determined color response of said object medium with reference to a maximal brightness attainable therewith relative to a maximal brightness attainable with said reference medium, and scaling a maximal range of color responses of said object medium with a maximal range of color responses of said reference medium, and B. mapping the calibrated color response of said object medium with the calibrated color response of said reference medium.

5. A method for determining a transform of color image information for the recordal of transformed color image information on a selected object medium with control of color relative to a selected reference medium, said method comprising the steps of A. selecting a colorimetric color space that is substantially isotropic and uniform throughout a selected gamut, B. calibrating a color response of said object medium and a color response of said reference medium on a common basis over said selected gamut, said calibrating step including calibrating the color response of each said medium with reference to said colorimetric color space, and calibrating the color response of each said medium according to a common linear basis, and C. mapping the calibrated color response of said object medium with the calibrated color response of said reference medium.

6. A method for transforming given color image information with selected control of color to output color image information for further processing, wherein said given information is on a pixel basis, said method comprising the steps of A. providing a single approximate value, which is of low color exactness, of said output information in response to more significant measures of said given information, B. responding to less significant measures of said given information to provide a plurality of finalizing values which identify with high color exactness said output information, and C. arithmetically combining said approximate value with said finalizing values to obtain said output information with said selected control of color.

7. A method according to claim 6 further characterized in that said providing of finalizing values includes determining interpolation values for said single approximate value.

8. A method according to claim 6 wherein said given information has plural color components and said output information has plural color components, and further characterized in that A. said providing of a single approximate value includes providing, for each pixel, a different single approximate value for each color component of said output information in response to more significant measures of a corresponding color component of said given information and at least one other color component of said given information, and B. said providing of finalizing values includes providing, for each pixel, finalizing values for each color component of said output information in response to less significant measures of said plural color components of said given information.

9. A method according to claim 6 further characterized in that said given information has plural color components and said output information has plural color components, and further including the step of producing, for each pixel, plural color components of output information in response to an arithmetic combination, for each color component of said output information, of (i) a single approximate value provided in response to more significant measures of said plural color components of said given information, and (ii) plural finalizing values for said approximate value, each of which is provided in response to less significant measures of a different one of said plural color components of said given information.

10. A method for transforming given color image information with selected control of color to output color image information for further processing, wherein said given information is on a pixel basis, said method comprising the steps of A. providing an approximate representation, which is of low color exactness, of said output information in response to more significant measures of said given information, B. responding to less significant measures of given information to provide finalizing values which identify with high color exactness said output information, said providing of finalizing values including reading out gradient values from a digital store of gradient values used for interpolating between successive values of said approximate representation, and C. arithmetically combining said approximate representation with said finalizing values to obtain said output information with said selected control of color.

11. In an apparatus for transforming given color image information with selected control of color to output color image information, wherein said given information is on a pixel basis, the improvement comprising A. means for providing a single approximate value, which is of low color exactness, of said output information in response to more significant measures of said given information, B. means for providing a plurality of finalizing values, which identify with high color exactness said output information, in response to less significant measures of said given information, and C. means for arithematically combining said approximate value and said finalizing values to obtain said output information with said selected control of color.

12. In an apparatus according to claim 11, the further improvement wherein said means for providing finalizing values includes means for obtaining interpolation values for said approximate value.

13. In an apparatus according to claim 11 wherein said given information has plural color components and said output information has plural color components, the further improvement wherein
   A. said first providing means includes means for providing, for each pixel, a different single approximate value for each color component of said output information in response to more significant measures of a corresponding color component of said given information and at least one other color component of said given information, and
   B. said second providing means includes means for providing, for each pixel, finalizing values for each color component of said output information in response to less significant measures of said plural color components of said given information.

14. In an apparatus for transforming given color image information with selected control of color to output color image information, wherein said given information is on a pixel basis, the improvement comprising
   A. means for providing an approximate representation, which is of low color exactness, of said output information in response to more significant measures of said given information,
   B. means for providing finalizing values, which identify with high color exactness said output information, in response to less significant measures of said given information, said means for providing finalizing values including means for storing gradient values used for interpolating between successive values of said approximate representation, and
   C. means for arithmetically combining said approximate representation and said finalizing values to obtain said output information with said selected control of color.

15. Apparatus for the recording of digital color image information on a selected object medium with selected control of color relative to a selected reference medium, said apparatus comprising, in combination,
   A. input means for storing given color image information on a pixel basis,
   B. output means for receiving transformed color image information for recordal on said object medium, and
   C. color image information transform means connected for transforming said given information stored by said input means to said transformed information to be received by said output means, said transform means performing said transformation in accordance with a mapping of a color response of said object medium according to a selected colorimetric color space with a color response of said reference medium according to said selected colorimetric color space, said transform means including
   (i) approximate transform means responsive to more significant measures of said given information to provide plural approximate values, of relatively low color exactness, of said transformed information, (ii) finalizing transform means responsive to said given information to provide finalizing values of said transformed information, and (iii) means for arithmetically combining said approximate values and said finalizing values to obtain with high color exactness said transformed information.

16. Apparatus for the recording of digital color image information on a selected object meduim with selected control of color relative to a selected reference medium, said apparatus comprising, in combination,
   A. input means for storing given color image information on a pixel basis,
   B. output means for receiving transformed color image information for recordal on said object medium, and
   C. color image information transform means for transforming said given information stored by said input means to said transformed information to be received by said output means, said transform means performing said transformation in accordance with a mapping of a color response of said object medium according to a selected colorimetric color space with a color response of said reference medium according to said selected colorimetric color space, said transform means including
   (i) approximate transform means responsive to more significant measures of said given information to provide plural approximate values, of relatively low color exactness, of said transformed information, said approximate transform means including a first digital store of transform data for producing said approximate values in response to said more significant measures of said given information,
   (ii) finalizing transform means responsive to said given information to provide finalizing values of said transformed information, said finalizing transform means including a second digital store of gradient values used for interpolating between successive approximate values for providing said finalizing values in response to said given information, and
   (iii) means for arithmetically combining said approximate values and said finalizing values for obtaining with high color exactness said transformed information.

17. Apparatus for the recording of color image information on a selected object medium with control of color relative to a selected reference medium, said apparatus comprising, in combination,
   A. input means for storing given color image information on a pixel basis,
   B. output means for receiving transformed color image information for recordal on said object medium, and
   C. color image information transform means connected for transforming said given information stored by said input means to said transformed information to be received by said output means, said transform means performing said transformation in accordance with a mapping of a scaled color response of said object medium according to a selected isotropic and uniform colorimetric color space with a scaled color response of said reference medium according to said selected isotropic and uniform colorimetric color space.

18. Apparatus for the recording of color image information on a selected object medium with control of color relative to a selected reference medium, said apparatus comprising, in combination,
   A. input means for storing given color image information on a pixel basis, B. output means for receiving transformed color image information for recordal on said object medium, and C. color image information transform means connected for transforming said given information stored by said input means to said transformed information to be received by said output means, said transform means performing said transformation in accordance with a mapping of a scaled and substantially linearized color response of said object medium according to a selected isotropic and uniform colorimetric color space with a scaled and substantially linearized color response of said reference medium according to said isotropic and uniform color space, wherein said mapping includes normalizing each said response according to a maximal response of the corresponding medium and scaling a selected range of color responses of said object medium with a selected range of color responses of said reference medium.

19. Apparatus for the recording of color image information on a selected object medium with control of color relative to a selected reference medium, said apparatus comprising, in combination, A. input means for storing given color image information on a pixel basis, B. output means for receiving transformed color image information for recordal on said object medium, and C. color image information transform means connected for transforming said given information stored by said input means to said transformed information to be received by said output means, said transform means performing said transformation in accordance with a mapping of a calibrated color response of said object medium with a calibrated color response of said reference medium, wherein the color responses are calibrated by determining the color responses according to a common color space and scaling the determined color responses substantially identically over corresponding selected gamuts and with reference to corresponding maximal brightnesses attainable with the corresponding mediums.

20. In an apparatus for transforming given color image information comprising a plurality of input color components with selected control of color to output color image information comprising a plurality of output color components, the combination comprising A. means for receiving said input color components, B. memory means addressable by said received input color components for storing (1) sets of approximate values of said output color components, each set of approximate values being a selected transformation of a corresponding set of values of said input color components, and (2) interpolation values of said output color components, said interpolation values including gradient values used for interpolating between successive approximate values of said output color components, C. means responsive to said received input color components and to interpolation values output from said memory means in response to said received input color components for determining a set of finalizing values for a corresponding set of approximate values output from said memory means in response to said received input color components, and D. means for combining said set of finalizing values and said corresponding set of approximate values to produce a set of values of said output color components having said selected control of color.

21. In an apparatus according to claim 20, the further combination wherein

A. said means for receiving said input color components addresses said memory means with more significant measures of said received input color components to cause said memory means to output said corresponding set of approximate values and said interpolation values, and B. said means for determining responds to less significant measures of said received input color components.

22. A method for transforming given image information with selected control of color to output image information, wherein said given image information is on a pixel basis and has (m) color components, and said output image information has (m−1) plural color components, (m) being an integer greater than 3, comprising the steps of A. providing, for each pixel, a different single approximate value, which is of low color exactness, for each color component of said output information in response to more significant measures of each of said (m) color components of said given information, B. responding to less significant measures of said given information to provide, for each pixel, a plurality of finalizing values for each color component of said output information, each of said finalizing values being provided in response to a different one of said (m) color components of said given information, said finalizing values identifying said (m−1) color components of said output information with high color exactness, said providing of finalizing values including obtaining interpolation values for said approximate values, and C. arithmetically combining, for each pixel, each of said approximate values with the corresponding plurality of finalizing values to obtain said output information with selected control of color.

23. Appartus for the recording of digital color image information on a selected object medium with control of color relative to a selected reference medium, said apparatus comprising, in combination, A. input means for storing given color image information on a pixel basis, B. output means for receiving transformed color image information for recordal on said object medium, and C. color image information transform means for transforming said given information stored by said input means to said transformed information to be received by said output means, said transform means performing said transformation in accordance with a mapping of a color response of said object medium according to a selected isotropic and uniform colorimetric color space with a color response of said reference medium according to said selected isotropic and uniform colorimetric color space, said transform means including (i) approximate transform means responsive to more significant measures of said given information to provide a single approximate value, of relatively low color exactness, of said transformed information,
(ii) finalizing transform means responsive to said given information to provide finalizing values of said transformed information, and
(iii) means for arithmetically combining each said single approximate value and said finalizing values to obtain with high color exactness said transformed information.

* * * * *